United States Patent Office 3,139,445
Patented June 30, 1964

3,139,445
HALOFORM ADDITION PRODUCTS OF 17-FORMYL STEROIDS
Rudolf Wiechert and Emanuel Kaspar, Berlin-Wilmersdorf, Germany, assignors to Schering Aktiengesellschaft, Berlin, Germany, a corporation of Germany
No Drawing. Filed May 5, 1959, Ser. No. 810,995
Claims priority, application Germany May 23, 1958
9 Claims. (Cl. 260—397.1)

The present invention relates to steroid derivatives, and more particularly to haloform addition products of 17-formyl steroids and to methods of producing the same.

It is a primary object of the present invention to provide new haloform addition products of 17-formyl steroids.

It is another object of the present invention to provide a method of producing haloform addition products of 17-formyl steroids.

It is still another object of the present invention to provide new steroid derivatives which have important properties.

It is yet another object of the present invention to provide a new group of steroid derivatives, namely haloform addition products of 17-formyl steroids which can serve as intermediates for the production of many important steroid compounds.

Other objects and advantages of the present invention will be apparent from a further reading of the specification and of the appended claims.

With the above objects in view, the present invention mainly comprises as a new compound, a compound having the following general formula:

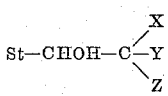

wherein St is a steroid radical linked at its 17-carbon atom to said CHOH group, and wherein X, Y and Z are halogens.

The method of producing the haloform addition products of 17-formyl steroids mainly comprises the step of reacting a 17-formyl steroid of the following general formula:

St-CHO wherein St is a steroid radical linked at its 17-carbon atom to said CHO group, with a haloform having the following general formula:

wherein X, Y and Z are halogens.

Thus, for example, it has been found that chloroform can form an addition product with a 17-formyl steroid in accordance with the following equation:

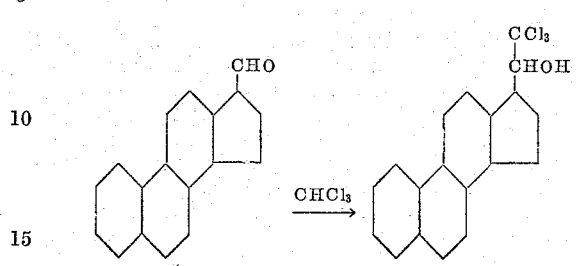

The reaction of the present invention will take place with any haloform of the following general formula:

Thus, for example, among the suitable haloforms may be mentioned $CHCl_3$, $CHBr_3$, $CHCl_2Br$, $CHClBr_2$ and $CHFClBr$. Of course, the most suitable haloform for reasons of economy and ready availability is chloroform.

The reaction according to the present invention proceeds even at low temperatures so that room temperature is therefore the most preferred temperature for carrying out the reaction. Of course, higher temperatures and somewhat lower temperatures may also be used. The reaction proceeds according to the present invention when the 17-formyl steroid is brought together with the haloform, most preferably chloroform, preferably dissolved in an inert organic solvent in the presence of an alkali metal alcoholate. Among the suitable inert organic solvents, that is organic solvents that are inert to the 17-formyl steroid, the haloform and the alkali metal alcoholate may be mentioned benzene, dioxane, butyl alcohol, amyl alcohol, tetrahydrofurane and mixtures thereof. Most preferably, a tertiary alcohol such as tertiary butanol and tertiary amyl alcohol are used in admixture with tetrahydrofurane.

The most preferred alkali metal alcoholates for carrying out the process of the present invention are the sodium and potassium tertiary alcoholates such as potassium tertiary butylate, sodium tertiary butylate, potassium tertiary amylate and sodium tertiary amylate.

In the practical commercial carrying out of the process of the present invention it is preferred to use excesses of both the haloform and the alkali metal alcoholate as compared to the formyl steroid since the haloform is itself attacked by the alkali metal alcoholate.

The reaction of the present invention proceeds with any 17-formyl steroid of the followin general formula:

St-CHO wherein St is any steroid radical. The steroid radical may contain in other positions in the molecule substituents which are inert to the haloform and the alkali metal alcoholate, as for example carbon-carbon double bonds, hydroxyl groups in free or functionally altered form, or inert keto-groups. If the molecule contains groups which are not inert to the haloform and the alkali metal alcoholate, such as a 3-keto group, such group may first be blocked in normal manner before the reaction with the haloform, for example by converting the group to a ketal or even to a hydroxyl group. Then, after the reaction with a haloform, if it is desired to have a final compound with the free unblocked group, for example with a 3-keto group, then the blocking radical may be removed in normal manner.

The new 21,21,21-trihalogen-20-hydroxy-steroids of the present invention may itself be used for their steroid-like properties, or as intermediate products in the synthesis of an entire series of steroid compounds. Thus, the process of the present invention by the haloform addition to a 17-formyl steroid results either in the modification of the physiological action of the starting material in a technically valuable manner, or the resulting haloform-addition product can advantageously be further converted into technically valuable steroid compounds.

Thus, for example, the action of chloroform on 17-formyl-$\Delta^4$-androstene-3-ol results in the production of 21,21,21-trichloro-$\Delta^4$-pregnene-3,20-diol which by oxidation by means of bichromate-glacial acetic acid is converted into 21,21,21-trichloroprogesterone which is found to have progestative activity upon subcutaneous administration in the Clauberg test.

Furthermore, the trichloromethyl group of the reaction product can be converted to a carboxyl group by saponification, for example, by means of lye such as sodium hydroxide. The in this manner easily obtainable carboxylic acids or their salts can be further transformation of the carboxyl group be converted into other valuable steroid compounds.

Thus, the carboxyl group of 3-oxo-20-hydroxy-$\Delta^4$-pregnene-21-acid, which can be obtained in accordance with the present invention by the chloroform addition to 17-formyl - $\Delta^4$ - androstene-3-ol to produce 21,21,21-trichloro-$\Delta^4$-pregnene-3,20-diol which by Oppenauer oxidation produces 21,21,21-trichloro-$\Delta^4$-pregnene-3-one-20-ol which is then saponified by means of sodium hydroxide or the like, can be esterified with $\beta$ - diethylaminoethylchloride. The resulting $\beta$-diethylaminoethyl-ester of the 3-oxo-20-hydroxy - $\Delta^4$ - pregnene-21-acid has a coronary vessel dilation and blood presure lowering action.

Among other products which may be produced in the present invention from the 21-position carboxyl group are its amidation and its Grignardation products. The amidation product is preferably produced through the acid halogenide and its reaction with amines, for example morpholine to produce pharmacologically interesting compounds.

The Grignardation, among which are included the reaction of suitable acid derivatives not only with alkyl magnesium halogenides, but also with lithium alkyls, zinc alkyls and the like, permit a lengthening of the side chains.

The following examples are given to further illustrate the present invention. The scope of the invention is not, however, meant to be limited to the specific details of the examples.

EXAMPLE 1

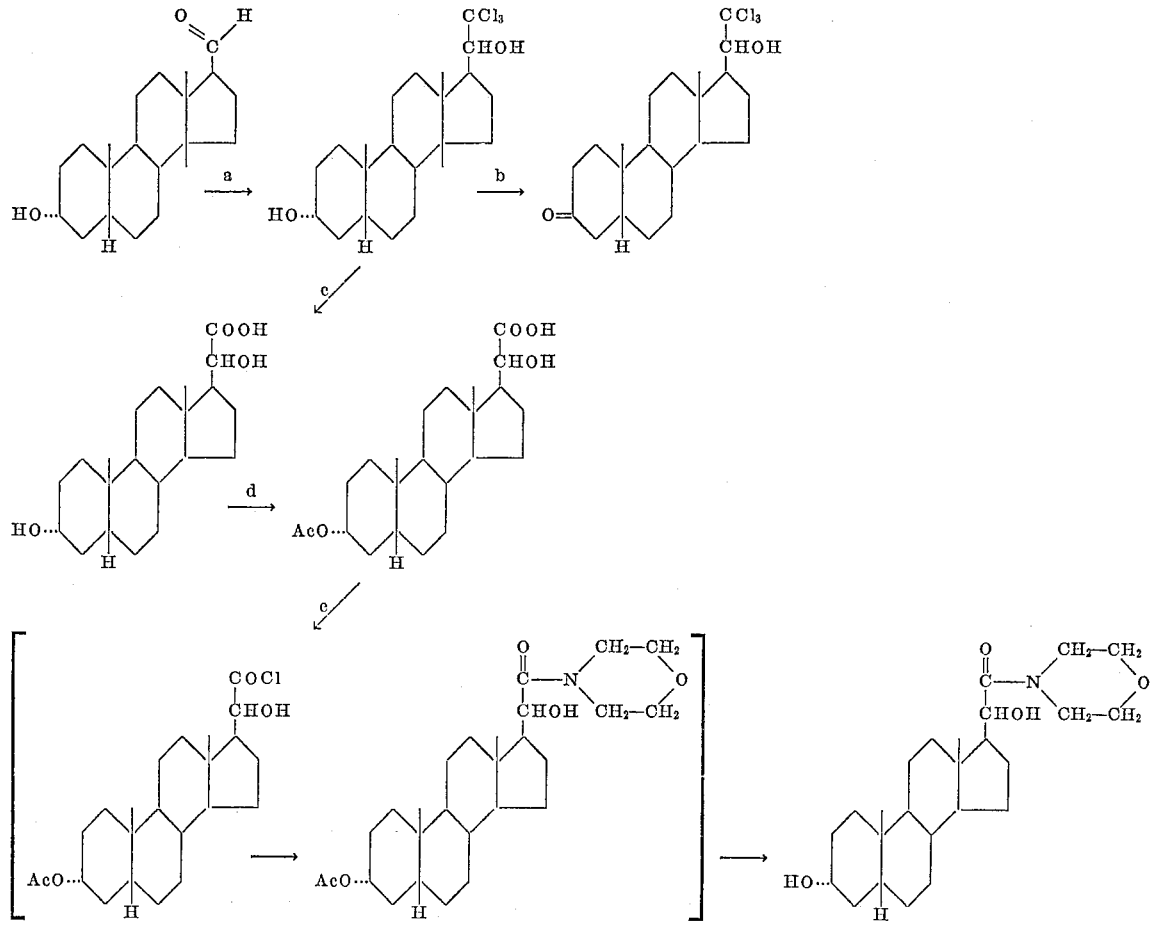

EXAMPLE 2

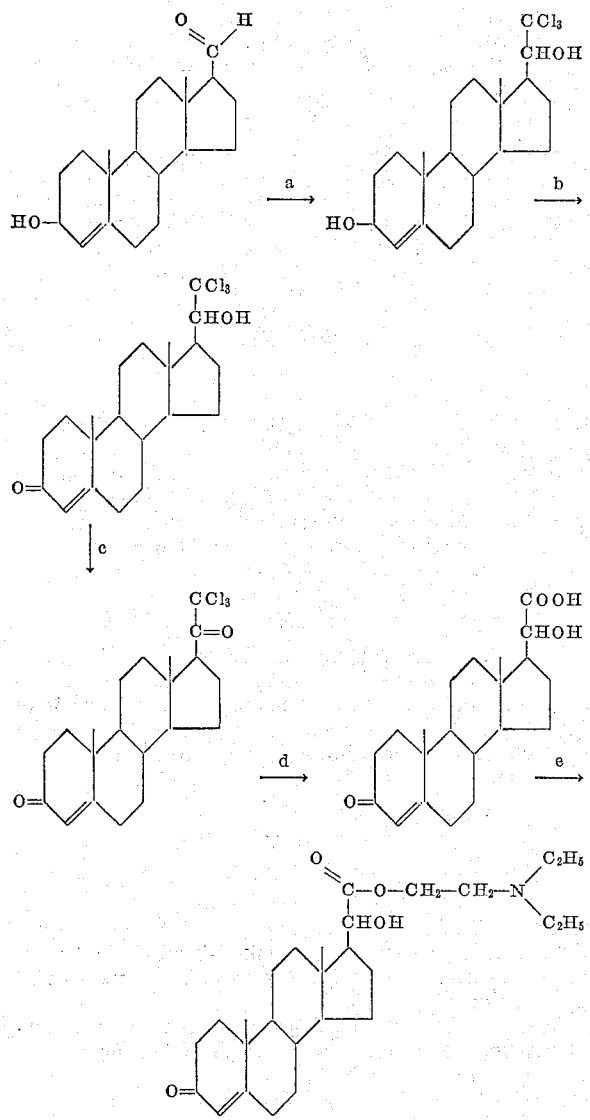

The preceding equations illustrate the examples which follow:

EXAMPLE 1

(a) 500 mg. of 17β-formyl-testane-3α-ol are dissolved in 9 cc. absolute tetrahydrofurane 0.97 cc. of chloroform. There is then added to this solution dropwise, under stirring in a nitrogen atmosphere during a time period of 30 minutes 1.1 g. of potassium tertiary butylate in 8 cc. of tetrahydrofurane and 10 cc. of tertiary butanol. The solution is then further stirred for 10 minutes, diluted with water and extracted with methylene chloride. The methylene chloride phase is subsequently dried with sodium sulfate and under a nitrogen atmosphere concentrated to dryness under vacuum. The obtained oil is rubbed under pentane at −75° C. and filtered off by suction.

(b) 512 mg. of the crude 21,21,21-trichloropregnane-3α,20ξ-diol are dissolved in 13.4 cc. of absolute benzene. 3.83 cc. of cyclohexanone are added, several cc. are distilled off to remove moisture which is present, 382 mg. of aluminum isopropylate dissolved in 2.6 cc. of absolute benzene are added dropwise during the time period of 5 minutes, and then the reaction mixture is heated to boiling with very slight distillation off during the time period of 45 minutes. After normal further working up of the reaction mixture by steam distillation the resulting precipitated product is filtered off by suction. The 21,21,21-trichloro-20ξ-hydroxy-pregnane-3-one which is recrystallized from isopropyl ether melts at 218–220° C.

Infra-red spectrum: C=O band at 5.85μ, C—Cl band at 12.5μ, OH band at 2.98μ.

(c) 424 mg. of crude 21,21,21-trichloro-pregnane-3α, 20ξ-diol are dissolved in 5 cc. of methanol which contains 170 mg. of sodium hydroxide. 786 mg. of sodium hydroxide in 5.7 cc. of water are added under a nitrogen atmosphere. The solution is heated to refluxing for 2 hours and then stirred in 35 cc. of 1 normal cold hydrochloric acid. The acid which is filtered off under suction is recrystallized from isopropyl ether. The compound which is obtained is 3α-hydroxy-5β-androstane-17β-yl-oxy-acetic acid which melts at 221–223° C.

(d) 500 mg. 3α-hydroxy-5β-androstane-17β-yl-oxy-acetic acid, 2 cc. of acetic anhydride and 2 cc. of pyridine are heated for 2 hours on a steam bath and then stirred into ice water. The precipitated substance is filtered off under suction and recrystallized from isopropyl ether. The substance is 3α-hydroxy-5β-androstane-17β-yl-oxy-acetic acid-3-acetate and melts at 216–218° C.

(e) 600 mg. of 3α-hydroxy-5β-androstane-17β-yl-oxy-acetic acid-3-acetate are dissolved in 15 cc. of absolute benzene and 6 drops of absolute pyridine and then under ice cooling 3 cc. of oxalyl chloride are added slowly. The solution is then kept for 1 hour at 10° C. under exclusion of moisture and subsequently the solution is drawn off under high vacuum. 5 cc. of absolute benzene are then added thereto 3 times and it is again drawn off. The crude acid chloride is stirred in 75 cc. of absolute ether and 0.65 cc. of morpholine for 16 hours at room temperature and then heated for 1 hour under refluxing. After dilution with ether the reaction mixture is washed to neutral with dilute potassium hydroxide and subsequently with water. After drying with sodium sulfate and concentration under vacuum there is obtained as an oil the crude N(3α - hydroxy - 5β - androstane-17β-yl-oxy-acetic acid-3-acetate)-morpholine. 665 mg. thereof are dissolved in 84 cc. of methanol and heated for 1 hour under nitrogen with 65 mg. of potassium bicarbonate in 8.3 cc. of water. The heating is under refluxing. After working up in the usual manner there is obtained N-(3α-hydroxy-5β-androstane17β-yl-oxy-acetic acid)-morpholine having a melting point of 159–161° C.

EXAMPLE 2

(a) 500 mg. of 17β-formyl-Δ⁴-androstene-3β-ol are reacted and worked up as described under 1(a) above. There is thus obtained as an oil which is further worked up as a crude product, 21,21,21-trichloro-Δ⁴-pregnene-3β-20ξ-diol.

(b) 500 mg. of 21,21,21-trichloro-Δ⁴-pregnene-3β,20ξ-diol are oxidized as described in 1(b) above to 21,21,21-trichloro-Δ⁴-pregnene-20ξ-ol-3-one which has a melting point of 207° C.

Ultraviolet spectrum: $\epsilon_{240}$=16,500.

(c) 842 mg. 21,21,21-trichloro-Δ⁴-pregnene-20ξ-ol-3-one, 681 mg. of sodium bicromate containing 2 mols of water of crystallization and 35 cc. of acetic acid are heated for 2 hours on a steam bath. After working up in the usual manner and recrystallization from acetone there is obtained 21,21,21-trichloro-Δ⁴-pregnene-3,20-dione having a melting point of 193–195° C.

Ultraviolet spectrum: $\epsilon_{240}$=17,300.

(d) 424 mg. of 21,21,21-trichloro-Δ⁴-pregnene-20ξ-ol-3-one are saponified and worked up as described in 1(c) above. The resulting compound is Δ⁴-androstene-17β-yl-oxy-acetic acid-3-one having a melting point of 259–263° C.

(e) 2.49 g. of β-diethylaminoethylchloride-hydrochloride are dissolved in 3.45 cc. of water and 13 cc. of ice cooled saturated potassium carbonate solution are added thereto at 0° C. The solution is extracted three times with 25 cc. of isopropanol. 1.73 g. of Δ⁴-androstene-17β- yl-oxy-acetic acid-3-one are added to the alcohol phase which has been dried with potassium carbonate and then heated for 5 hours under refluxing. The alcohol is subsequently distilled off under vacuum, the residue dissolved in 85 cc. of water and 36.5 cc. of 3 normal hydrochloride acid and extracted four times with methylene choride. The methylene chloride phase is dried over sodium sulfate, concentrated to dryness under vacuum, rubbed with ether and the hydrochloride of the precipitated β-diethylaminoethylester of Δ⁴-androstene-17β-yl-oxy-acetic acid-3-one having a melting point of 197.5–199.5° C. is filtered off by suction.

EXAMPLE 3

(a) 3.4 g. of 17β-formyl-Δ⁴-androstene-3-β-ol are dissolved in 50 cc. of absolute tetrahydrofurane. 14 g. bromodichloromethane are added thereto at —20° C. There is then added to this solution dropwise under a nitrogen atmosphere during a time period of 30 minutes 7.6 g. of potassium tertiary butylate in 56 cc. of absolute tetrahydrofurane and 68 cc. of tertiary butanol. The solution is further stirred for 15 minutes and then worked up as described in Example 1(a).

(b) 500 mg. of the oily crude 21-bromo-21,21-dichloro-Δ⁴-androsten-3β,20ξ-diol are oxidized by Oppenauer-oxidation and worked up as described in Example 1(b).

There is obtained as an oil the 2-bromo-21,21-dichloro-Δ⁴-androsten-20ξ-ol-3-one.

Without further analysis, the foregoing will so fully reveal the gist of the present invention that others can by applying current knowledge readily adapt it for various applications without omitting features, that, from the standpoint of prior art, fairly constitute essential characteristics of the generic of specific aspects of this invention and, therefor, such adaptations should and are intended to be comprehended within the meaning and range of equivalence of the following claims.

What is claimed as new and desired to be secured by Letters Patent is:

1. 21,21,21-trichloro-Δ⁴-pregnene-3,20-diol.
2. 21,21,21-trichloroprogesterone.
3. 21,21,21-trichloro-Δ⁴-pregnene-3 - one-20-ol melting at 207° C. and exhibiting an ultraviolet spectrum of $\epsilon_{240} = 16,500$.
4. In a method of producing steroid derivatives, the step of reacting a 17-formyl steroid of the following general formula:

St-CHO wherein St is a steroid radical selected from the group consisting of androstane-3β-ol, androstane-3-one, Δ⁴-androstene-3β-ol, Δ⁴-androstene-3-one and testane-3α-ol linked at its 17-carbon atom to said CHO group with a haloform having the following general formula:

wherein X, Y and Z are halogens selected from the group consisting of chlorine and bromine.

5. In a method of producing steroid derivatives, the step of reacting a 17-formyl steroid of the following general formula:

St-CHO wherein St is a steroid radical selected from the group consisting of androstane-3β-ol, androstane-3-one, Δ⁴-androstene-3β-ol, Δ⁴-androstene-3-one and testane-3α-ol linked at its 17-carbon atom to said CHO group with a haloform having the following general formula:

wherein X, Y and Z are halogens selected from the group consisting of chlorine and bromine dissolved in an organic solvent inert to said reaction.

6. In a method of producing steroid derivatives, the step of reacting a 17-formyl steroid of the following general formula:

St-CHO wherein St is a steroid radical selected from the group consisting of androstane-3β-ol, androstane-3-one, Δ⁴-androstene-3β-ol, Δ⁴-androstene-3-one and testane-3α-ol linked at its 17-carbon atom to said CHO group with a haloform having the following general formula:

wherein X, Y and Z are halogens selected from the group consisting of chlorine and bromine dissolved in an organic solvent inert to said reaction and being selected from the group consisting of benzene, dioxane, butyl alcohol, amyl alcohol, tetrahydrofurane and mixtures thereof.

7. In a method of producing steroid derivatives, the step of reacting a 17-formyl steroid of the following general formula:

St-CHO wherein St is a steroid radical selected from the group consisting of androstane-3β-ol, androstane-3-one, Δ⁴-androstene-3β-ol, Δ⁴-androstene-3-one and testane-3α-ol linked at its 17-carbon atom to said CHO group, with a haloform having the following general formula:

where X, Y and Z are halogens selected from the group consisting of chlorine and bromine dissolved in an organic solvent inert to said reaction and in the presence of an alkali metal alcoholate.

8. In a method of producing steroid derivatives, the step of reacting a 17-formyl steroid of the following general formula:

St-CHO wherein St is a steroid radical selected from the group consisting of androstane-3β-ol, androstane-3-one, Δ⁴-androstene-3β-ol, Δ⁴-androstene-3-one and testane-3α-ol linked at its 17-carbon atom to said CHO group with a haloform having the following general formula:

wherein X, Y and Z are halogens selected from the group consisting of chlorine and bromine dissolved in an organic solvent inert to said reactions and being selected from the group consisting of benzene, dioxane, butyl alcohol, amyl alcohol, tetrahydrofurane and mixtures thereof and in the presence of an alkali metal alcoholate selected from the group consisting of potassium tertiary butylate, potassium tertiary amylate, sodium tertiary butylate and sodium tertiary amylate.

9. The β-diethylaminoethyl ester of 3-oxo-20-hydroxy-Δ⁴-pregnene-21-acid.

References Cited in the file of this patent

UNITED STATES PATENTS 2,773,077  Conbere _____ Dec. 4, 1956